UNITED STATES PATENT OFFICE.

ALFRED B. KITTSON, OF BOSTON, AND ARTHUR BENJ. BROWNE, OF CAMBRIDGE, MASSACHUSETTS, ASSIGNORS OF ONE-THIRD TO CHARLES M. REED, OF BOSTON, MASSACHUSETTS.

PIGMENT FOR PAINTS.

SPECIFICATION forming part of Letters Patent No. 602,163, dated April 12, 1898.

Application filed May 21, 1894. Serial No. 512,000. (No specimens.)

*To all whom it may concern:*

Be it known that we, ALFRED B. KITTSON, of Boston, county of Suffolk, and ARTHUR BENJ. BROWNE, of Cambridge, county of Middlesex, State of Massachusetts, have invented an Improvement in Pigments for Paints, of which the following is a specification.

The protective properties of metallic paint, preventing oxidation and destruction due to exposure, have led to a very extended employment, such paint having as its base or pigment the peroxid of iron. If the peroxid is pure, it will be uniform in color. Where it is not uniform in color, it is due to the presence of materials not composed of iron and subject to decomposition on exposure to the elements.

For some time there has been a widespread demand for a black, gray, or other colored metallic paint of equal efficacy as the red which should contain such a small proportion of the coloring-pigment as to be harmless. With this end in view the natural black magnetic oxid of iron has been ground and used as a pigment or base for paint, and iron or steel scale has been ground and similarly used, but in each case with no practical success. In both instances the crystalline character of the material is retained, no matter how thoroughly ground, rendering it impossible for the vehicle to thoroughly permeate the particles, and consequently detracting from its value as a protective paint. The use of the natural magnetic oxid in the manner referred to would be prohibited on account of the cost of grinding to the requisite fineness. It is also open to the same objection as the red oxid—namely, its crystalline character. As to the scale, it is magnetic only on the exterior, and the interior is not the black oxid of iron.

In our experiments to obtain a cheap black metallic paint superior in value to the well-known red paint and which can be widely varied as to color by the addition of a very small proportion of the desired pigment we have discovered that amorphous black magnetic oxid of iron spongaceous in character can be cheaply produced and used as a pigment or base for paint which will possess the desired properties and characteristics. In accordance therewith our invention consists in the use of amorphous black magnetic oxid of iron as a pigment for paint, substantially as will be described.

Other features of our invention will be hereinafter described, and particularly pointed out in the claims.

In carrying out our invention we pulverize the material, which may be roasted iron pyrites, the ash from sulfuric-acid manufacture, or other materials containing peroxid of iron. After pulverizing the material it is heated in a revolving chamber in the presence of a reducing-gas, preferably carbon monoxid, which fills the chamber and is brought into contact with the material therein. The peroxid of iron is reduced thereby to a black magnetic oxid of iron, the gas escaping as carbon dioxid, and the reduction may be performed by any well-known apparatus. The chemical reaction is as follows: $3Fe_2O_3 + CO = 2Fe_3O_4 + CO_2$, the peroxid of iron in the material, whatever the latter may be, being reduced in accordance with such reaction. The magnetic oxid of iron is separated from the gangue and other impurities by any of the various magnetic separators in common use, whereby a substantially pure magnetic oxid is obtained, averaging ninety-five to ninety-eight per cent. in purity. This product is amorphous, spongy, friable, and easily ground into a fine powder, after which it can be mixed with a suitable vehicle, such as oil, japan, &c., to form a paint. A dead-black paint is thus obtained, applicable wherever it is desired to prevent rust or corrosion, its base consisting of practically pure black magnetic oxid of iron.

A fine slate gray is obtained by the addition of a very small proportion of baryta, zinc-white, or any similar substance which will not set up electrical action or be decomposed by exposure to the elements.

The addition of small and varied quantities of chrome yellow gives various shades of olive green, and a handsome blue may be obtained by an addition of cyanid of potassium and the oxid of zinc.

The proportion of coloring-matter added to the black paint is so small that there is no appreciable deterioration in its qualities.

We claim—

1. A paint comprising a base of non-crystalline magnetic oxid of iron, and a proper vehicle, as oil or japan, substantially as described.

2. A paint consisting of a base of spongy, friable, non-crystalline black magnetic oxid of iron, a coloring-matter, and a vehicle, combined to form a smooth and completely-mixed paint, substantially as described.

3. A paint comprising a base of non-crystalline spongy, friable magnetic oxid of iron in the form of an impalpable powder, and a vehicle, said vehicle being combined with said base so as to permeate every particle thereof, substantially as described.

In testimony whereof we have signed our names to this specification in the presence of two subscribing witnesses.

ALFRED B. KITTSON.
ARTHUR BENJ. BROWNE.

Witnesses:
JOHN C. EDWARDS,
FREDERICK L. EMERY.